United States Patent
Evans et al.

(10) Patent No.: US 7,872,388 B2
(45) Date of Patent: Jan. 18, 2011

(54) ROTOR FOR AN ELECTRICAL MACHINE WITH IMPROVED TEMPERATURE STABILITY

(75) Inventors: Susanne Evans, Buehl (DE); Wolf-Joachim Eggers, Lübeck (DE); Helmut Aesche, Ottersweier (DE); Marlene Aesche, legal representative, Ottersweier (DE); Jens Helmut Aesche, legal representative, Ottersweier (DE); Heidi Marlene Aesche, legal representative, Ottersweier (DE); Juergen Herp, Buehl (DE); Markus Heidrich, Buehl (DE); Steven-Andrew Evans, Buehl (DE); Tilo Koenig, Buehl (DE); Markus Peters, Baden-Baden (DE); Joachim Van Wijhe, Buehlertal (DE); Lin Feuerrohr, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 1004 days.

(21) Appl. No.: 10/576,099

(22) PCT Filed: Aug. 17, 2004

(86) PCT No.: PCT/DE2004/001827
§ 371 (c)(1),
(2), (4) Date: Jan. 31, 2007

(87) PCT Pub. No.: WO2005/046023
PCT Pub. Date: May 19, 2005

(65) Prior Publication Data
US 2007/0194648 A1    Aug. 23, 2007

(30) Foreign Application Priority Data
Oct. 17, 2003   (DE) ............................... 103 48 394

(51) Int. Cl.
*H02K 21/12* (2006.01)
(52) U.S. Cl. .......................... 310/156.28; 310/156.16; 310/156.38
(58) Field of Classification Search ............ 310/156.28, 310/156.16, 156.38
See application file for complete search history.

(56) References Cited

U.S. PATENT DOCUMENTS

| 1,996,946 | A | * | 4/1935 | Beeh | ...................... | 310/156.51 |
| 3,019,359 | A | | 1/1962 | Crommen | | |
| 3,909,647 | A | | 9/1975 | Peterson | | |
| 4,137,884 | A | * | 2/1979 | Odazima et al. | ........ | 123/149 D |

(Continued)

FOREIGN PATENT DOCUMENTS

DE    1 092 113    11/1960

(Continued)

OTHER PUBLICATIONS

Machine Translation of DE 3021607 A Document.*

*Primary Examiner*—Quyen Leung
*Assistant Examiner*—Alex W Mok
(74) *Attorney, Agent, or Firm*—Ronald E. Greigg

(57) ABSTRACT

The present invention relates to an electrical machine including a rotor shaft, a hollow-cylindrical magnet element, a first covering disk, and a second covering disk, in which the first and second covering disks are secured to the rotor shaft, and the magnet element is secured on its first axial end to the first covering disk and on its second axial end to the second covering disk.

18 Claims, 4 Drawing Sheets

U.S. PATENT DOCUMENTS

| | | | |
|---|---|---|---|
| 4,472,650 A | 9/1984 | Advolotkin et al. | |
| 4,477,744 A | 10/1984 | Gerber | |
| 4,510,409 A | 4/1985 | Kanayama | |
| 4,543,506 A | 9/1985 | Kawada et al. | |
| 4,667,123 A * | 5/1987 | Denk et al. | 310/156.22 |
| 4,672,250 A | 6/1987 | Seitz | |
| 4,745,319 A | 5/1988 | Tomite et al. | |
| 4,908,535 A | 3/1990 | Kreuzer et al. | |
| 5,010,266 A * | 4/1991 | Uchida | 310/156.22 |
| 5,140,210 A * | 8/1992 | Shirakawa | 310/156.28 |
| 5,483,116 A | 1/1996 | Kusase et al. | |
| 5,508,576 A * | 4/1996 | Nagate et al. | 310/156.54 |
| 5,574,323 A | 11/1996 | Nusser | |
| 5,596,238 A | 1/1997 | Milnikel | |
| 5,793,144 A | 8/1998 | Kusase et al. | |
| 5,925,964 A | 7/1999 | Kusase et al. | |
| 5,939,809 A * | 8/1999 | Mobius | 310/156.28 |
| 6,047,461 A | 4/2000 | Miura et al. | |
| 6,282,053 B1 | 8/2001 | MacLeod et al. | |
| 2001/0048261 A1 * | 12/2001 | Kojima et al. | 310/156.13 |

FOREIGN PATENT DOCUMENTS

| | | |
|---|---|---|
| DE | 30 21 607 A1 | 12/1981 |
| DE | 4401847 A1 | 7/1995 |
| EP | 1075073 A1 * | 2/2001 |
| FR | 2723490 A1 | 2/1996 |
| JP | 60-152239 | 8/1985 |
| JP | 03007035 A | 1/1991 |
| JP | 2000-69719 | 3/2000 |
| JP | 2001-45703 | 2/2001 |
| JP | 2001-178039 | 6/2001 |
| JP | 2004032958 A * | 1/2004 |

* cited by examiner

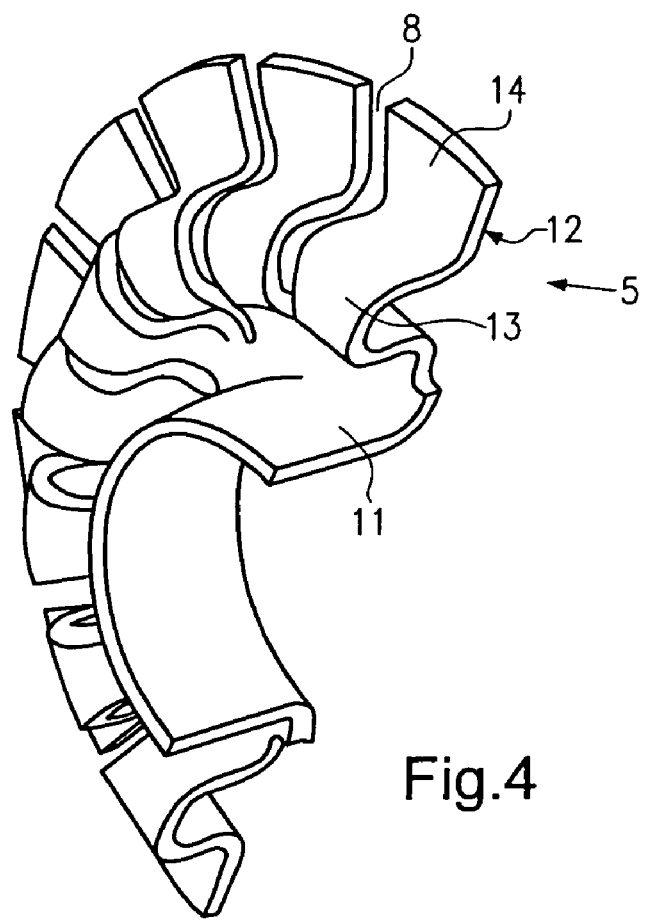
Fig.4
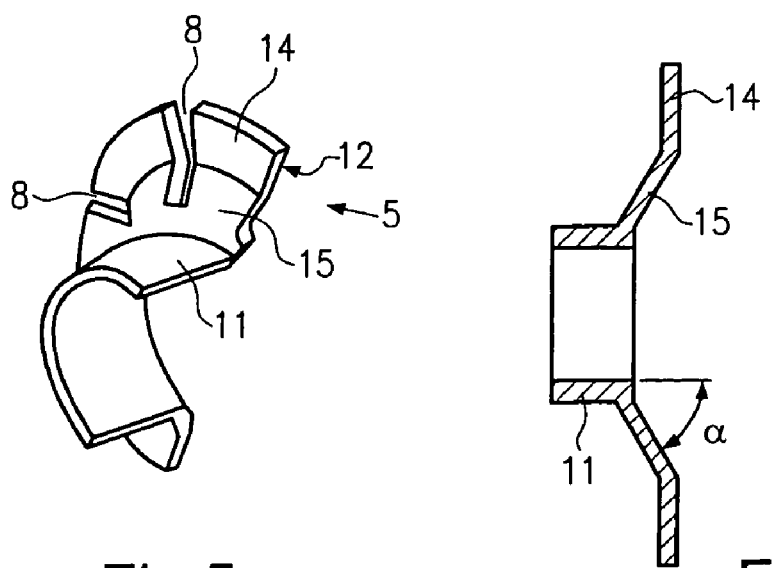
Fig.5
Fig.6

ROTOR FOR AN ELECTRICAL MACHINE WITH IMPROVED TEMPERATURE STABILITY

CROSS-REFERENCE TO RELATED APPLICATIONS

This application is a 35 USC 371 application of PCT/DE 2004/001827 filed on Aug. 17, 2004.

BACKGROUND OF THE INVENTION

1. Field of the Invention

The present invention relates to a rotor for an electrical machine and particularly to a rotor for an EC motor with improved temperature stability, which is constructed in particular with NdFeB magnets, and to an electrical machine with such a rotor.

2. Description of the Prior Art

Electrical machines are known for instance in the form of electric motors, in which a ring magnet is secured to the rotor. In production, this necessitates securing the ring magnet to the rotor shaft. Typically, an adhesive is used for this. Often, the hollow-cylindrical ring magnets are also joined together with cylindrical carrier bodies (for a magnetic short circuit, often of steel) secured to the rotor shaft by means of applying adhesive in the gap between the ring magnet and the carrier body. In operation, however, because of the different coefficients of thermal expansion of the different materials for the ring magnet, the carrier body, and the adhesive, a relative motion of the components to one another occurs. Especially in the high temperature range, because of the different expansions of the materials, breakage of the ring magnet can occur. Another disadvantage of the adhesive process is putting the adhesive into the gap between the carrier body and the ring magnet. The gap must have a certain thickness, if the adhesive process is to be at all feasible in production. The greater the spacing between the ring magnet and the carrier body, however, the higher are the magnetic losses. Moreover, the attempt has been made for several years to use rare earths as the magnet material. That material, however, in comparison to the ferritic magnet materials, has even less expansion upon a temperature increase, to the point of negative expansion; thus if these materials are used, the risk of magnet breakage increases markedly.

SUMMARY AND ADVANTAGES OF THE INVENTION

In the rotor according to the invention for an electrical machine, a complete temperature compensation (length compensation) can be accomplished between the parts that are made from different materials. Moreover, in the rotor of the invention for an electrical machine, the magnetic losses are minimized by means of a minimized gap between the magnet element and a component located in the interior of the magnet element. This is attained according to the invention by providing that the magnet element is secured, on at least one end located in the axial direction, by means of an elastic covering disk. Thus no adhesive needs to be provided on the inner jacket region of the magnet element, and thus the gap from an adjacent component can be selected to be markedly smaller.

To lend the rotor improved stability, the other end, located in the axial direction, of the hollow-cylindrical magnet element preferably rests on a shaft shoulder of the rotor shaft.

In another preferred refinement of the invention, the magnet element is secured by means of elastic covering disks on both of its ends located in the axial direction. As a result, a symmetrical rotor assembly can be achieved, which has especially good temperature compensation properties because of having two covering disks located on the ends of the magnet element.

Preferably, the magnet element is secured to the covering disks by means of an adhesive. This makes processing and positioning of the adhesive markedly easier and better, compared to the prior art. Moreover, positioning the connection between the magnet element and the rotor shaft on the axial ends of the magnet element makes it possible to use both high-viscosity and low-viscosity adhesives.

To furnish improved elasticity of the covering disks in both the radial and axial directions, the covering disks preferably each have at least one radially extending slit. Especially preferably, the slit extends from the outer circumference of the covering disk inward. Many radially extending slits are preferably provided in the covering disks and can have different lengths. Especially preferably, the covering disks have slits with a first length and slits with a second length, and the first length is greater than the second length. To furnish as uniform as possible an absorption of the thermal expansions of the components, the covering disks are preferably embodied symmetrically.

To furnish especially easy absorption of the thermal expansions of the components, the covering disks preferably have a yielding region. The yielding region can be furnished for instance by a bead extending all the way around in the circumferential direction. Especially in combination with the slits in the covering disk, an excellent compensation function can therefore be furnished by the covering disks. At least one slit should have a length which extends from the outer circumference of the covering disk as far as the yielding region, or even across the yielding region.

For the improved magnetic short circuit, a metal carrier body is preferably located inside the cylindrical-tubular magnet element. The carrier body has a predetermined spacing both from the magnet element and from the covering disks. The spacing from the other components, however, can be selected as markedly less than in the prior art, since no space for holding adhesive has to be provided, and hence the magnetic losses can be minimized by the embodiment of a minimal spacing.

Also preferably, the magnet element is surrounded by a cylindrical guard tube, to avoid damage to the magnet element. The cylindrical guard tube also furnishes protection against spinning for parts from which chips are broken off, so that seizing of the rotor can be averted.

The magnet element is preferably produced from a rare earth magnet material, such as NdFeB or SmCo.

The covering disks are preferably made from a nonmagnetic material, especially from special steel.

Also preferably, the covering disks are joined to the rotor shaft by nonpositive, positive, or material engagement, for instance by pressing, laser welding, or adhesive bonding. The connection between the covering disk and the rotor shaft must be designed so as to be capable of transmitting the requisite torques.

The rotor of the invention is preferably used in an electrical machine embodied as an EC motor, which is used especially preferably as a drive mechanism for convenience devices in vehicles, for instance as a drive for power windows, power seat adjusters, a power sunroof, a wiper motor, and so forth. Its use as an EC generator, in an EC steering system and as an engine compartment actuator, for instance a transmission actuator or clutch actuator, is also possible.

BRIEF DESCRIPTION OF THE DRAWINGS

Other features and advantages of the invention will be apparent from the description contained below, in conjunction with the drawings, in which:

FIG. 4 is a perspective sectional view of a covering disk, in a second exemplary embodiment of the present invention;

FIG. 5 is a schematic sectional view of a covering disk, in a third exemplary embodiment of the present invention;

FIG. 6 is a schematic sectional view of the covering disk shown in FIG. 5; and

DESCRIPTION OF THE PREFERRED EMBODIMENTS

Figure 1:
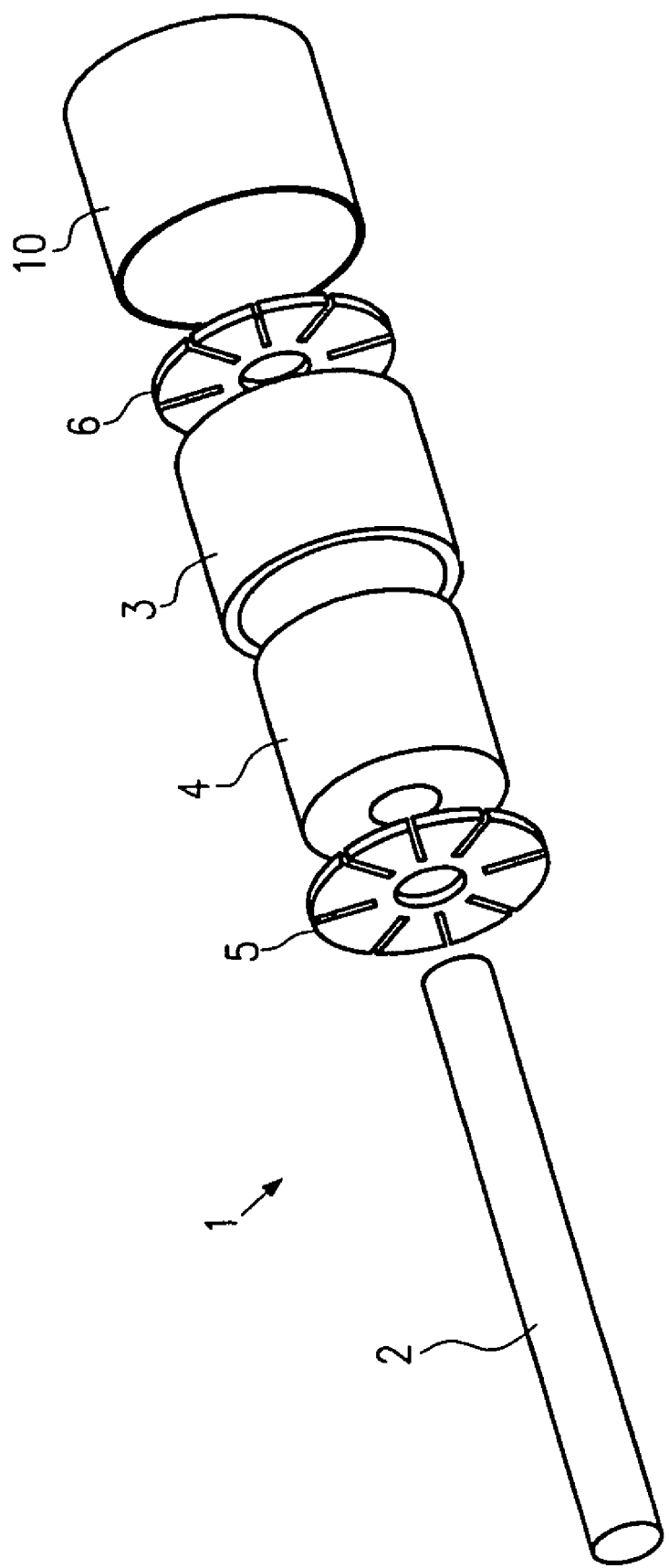
FIG. 1 is a schematic, perspective exploded view of a rotor unit of an electrical machine, in a first exemplary embodiment of the present invention.

FIG. 1 shows a perspective exploded view of a rotor assembly 1 of an electrical machine embodying the invention and including a rotor shaft 2, a carrier body 4, a hollow-cylindrical magnet element 3, a first covering disk 5, a second covering disk 6, and a guard tube 10. The carrier body 4 is secured to the rotor shaft 2. This may be accomplished by means of adhesive bonding, for instance, or by means of a press fit. The first covering disk 5 and the second covering disk 6 are likewise joined to the rotor shaft 2 in a manner fixed against relative rotation and axially fixed. The magnet element 3 is joined to one covering disk on each of its axial ends. More precisely, the axial end 3a of the magnet element 3 is joined to the first covering disk 5, and the axial end 3b is joined to the second covering disk 6 (see FIG. 2). The connection between the covering disks 5, 6 and the axial ends 3a and 3b is made by means of an adhesive. The magnet element 3 is located concentrically to the rotor shaft 2.

Figure 2:
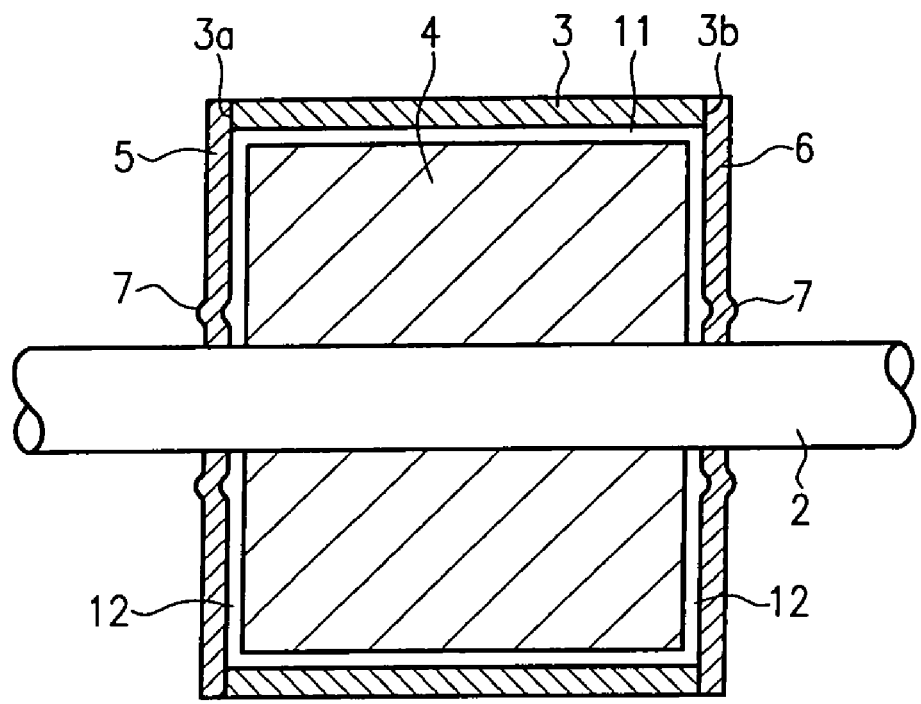
FIG. 2 is a schematic sectional view of the rotor assembly shown in FIG. 1.

As can be seen from FIG. 2, between the magnet element 3 and the carrier body 4, there is a gap 11 extending in the circumferential direction. In FIG. 2, the gap is shown enlarged for the sake of greater clarity. Since the securing of the magnet element 3 is done on its axial ends, the gap 11 between the magnet element 3 and the carrier body 4 can have a minimal size. As a result, magnetic losses resulting from the gap 11 can likewise be minimized.

As can also be seen from FIG. 2, there is also a small gap 12 between each of the two covering disks 5 and 6 and the carrier body 4. As a result, at high temperatures occurring during operation, touching one of the two covering disks 5, 6 by the carrier body as a consequence of different coefficients of thermal expansion can be prevented.

Figure 3:
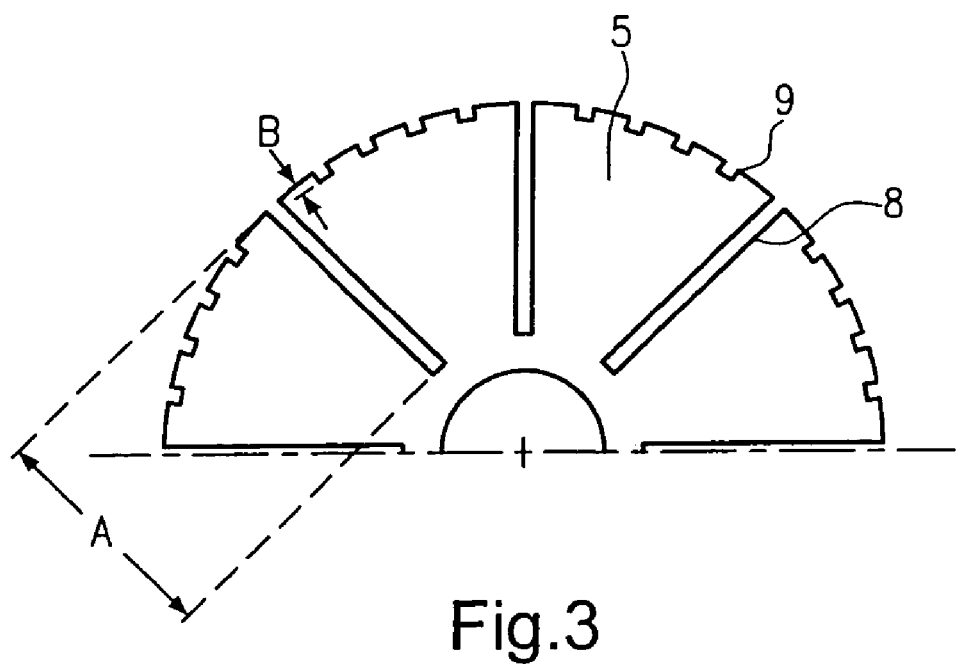
FIG. 3 is a schematic side view of a covering disk used in FIGS. 1 and 2.

The magnet element 3 is made from a rare earth material and has a thermal expansion that differs from that of the carrier body 4 and the rotor shaft 2. The different thermal expansion is compensated for by the first and second covering disks 5 and 6. To that end, the covering disks 5 and 6 have a yielding region 7, which is furnished by means of a bead embodied as extending in the circumferential direction. Also, as shown in FIG. 3, many slits are formed in the covering disks. More precisely, long slits 8 of a first length A are formed on the one hand in the covering disks. Between the long slits 8, a plurality of small slits 9 with a length B are formed. As a result, the covering disks 5, 6 can execute a length compensation in both the radial and the axial directions. To make the forces or deformations of the covering disks 5, 6 that occur upon the length compensation possible without problems, the covering disks 5, 6 are made from a nonmagnetic special steel.

The adhesive bond between the covering disks 5, 6 and the magnet element 3 can be furnished in a simple method step. In it, the adhesive need merely be applied to the appropriate portions, located in the radially outer region, of the covering disks 5 and 6 and/or to the axial ends of the magnet element, and then the covering disks 5, 6 are axially joined to the magnet element 3. Thus according to the invention there is a considerable simplification of the production process, compared to the application of adhesive in a narrow radial gap between the magnet element and the carrier body as in the prior art.

The electrical machine with the temperature compensation integrated according to the invention thus has an improved temperature stability and hence improved possibilities for its use.

Below, in conjunction with FIG. 4, a covering disk for a rotor of the invention will be described in terms of a second exemplary embodiment of the present invention in which the covering disk 5 has one substantially cylindrical region 11 and one substantially radially oriented region 12. The cylindrical region 11 serves as a securing region on a rotor shaft. The radial region 12 includes a yielding region 13 and a retention region 14 for the magnet element. As shown in FIG. 4, the radial region 12 is located on an end of the cylindrical region 11 that is located in the axial direction. The yielding region 13 has what in section is a substantially U-shape and furnishes a spring travel in both the radial direction and the axial direction. As a result, the covering disk 5 makes a temperature compensation possible for different temperature-dictated changes in length of the magnet element and the rotor shaft. The covering disk 5 of the second exemplary embodiment is embodied in one piece and is produced for instance by stamping and creative shaping of a cylindrical tubular piece. The slits 8 between the individual radial segments of the radial region 12 are all embodied with the same depth. Moreover, the cylindrical region 11 of the covering disk assures securing to the rotor shaft in a way that is fixed against relative rotation in the circumferential direction and is fixed against displacement in the axial direction. This can be accomplished for instance by means of a press fit.

Below, in conjunction with FIGS. 5 and 6, a covering disk 5 in a third exemplary embodiment of the present invention will be described. The covering disk of the third exemplary embodiment corresponds substantially to the covering disk of the second exemplary embodiment and includes both a cylindrical region 11 and a radial region 12. The radial region 12 is located on one axial end of the cylindrical region 11 and includes many tablike elements, which are oriented essentially in the radial direction. The tablike elements are each spaced apart from one another by slits 8 of equal depth. As shown in FIGS. 5 and 6, on the tablike elements both a retention region 14 for the magnet element and a connecting region 15 are embodied; the latter furnishes the connection between the cylindrical region 11 and the retention region 14.

The connecting region 15 is located at a predetermined angle to the cylindrical region 11. As shown in FIG. 6, the connecting region 15 is inclined by an angle $\alpha$ to the securing region 11. The angle $\alpha$ is preferably approximately 60°. At different temperature-caused changes in length of the individual components, the tablike elements change their springback angle to the rotor shaft and to the cylindrical region 11. As a result, compensation in both the radial and the axial direction is furnished.

The covering disk 5 of the third exemplary embodiment accordingly functions on the principle of the spring-back of the tablike elements of the radial region 12. Thus the covering disk of the third exemplary embodiment likewise furnishes a length compensation in both the radial and the axial direction. The covering disk of the third exemplary embodiment has an especially compact and simple construction.

Figure 7:
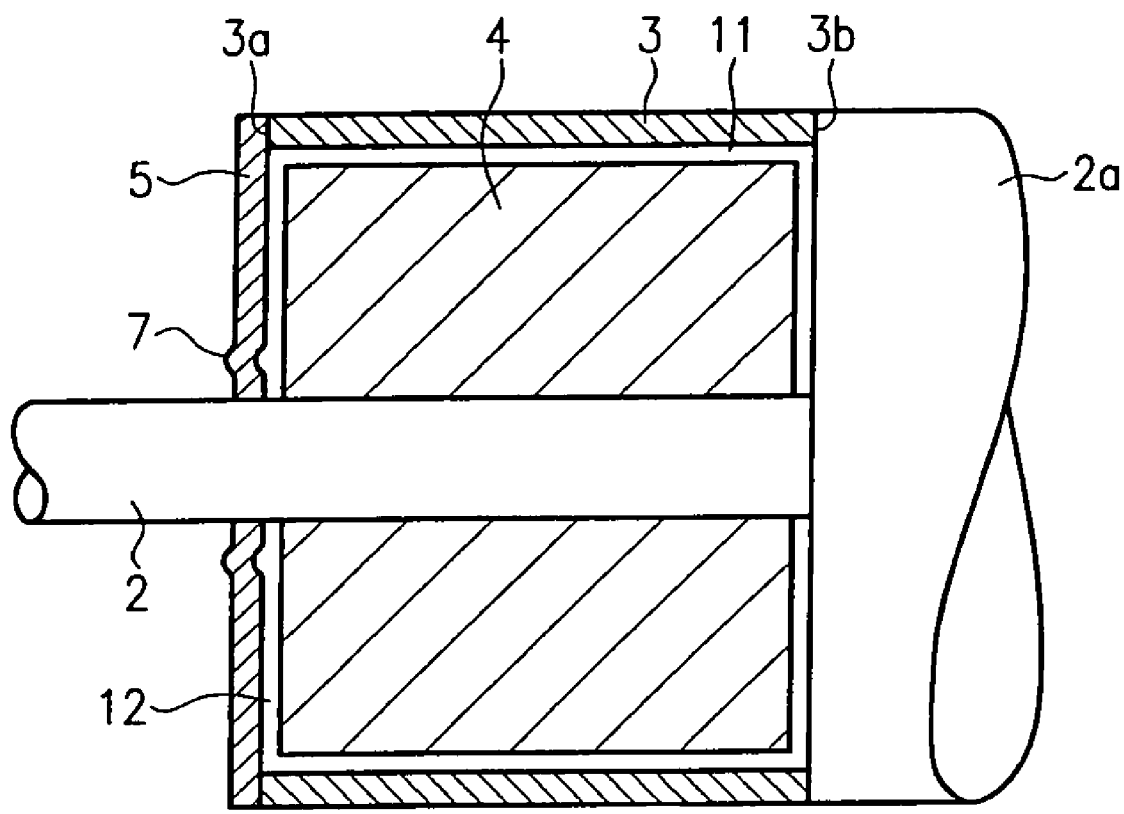
FIG. 7 is a schematic sectional view of a rotor assembly, in a fourth exemplary embodiment of the present invention.

FIG. 7 shows a rotor assembly in a fourth exemplary embodiment of the present invention. The view of the fourth exemplary embodiment corresponds substantially to the view in FIG. 2 of the first exemplary embodiment. In contrast to the exemplary embodiments described above, however, in the fourth exemplary embodiment only one covering disk 5 is used. Instead of a second covering disk, in the fourth exemplary embodiment a shaft shoulder 2a is formed on the rotor shaft 2 and has a diameter at least as great as the outer diameter of the magnet element 3. As a result, the magnet element 3 on its second axial end 3b is braced on the shaft shoulder 2a. The first axial end 3a of the magnet element 3 is, as in the previous exemplary embodiments, secured to a covering disk 5. Thus this covering disk 5 in the fourth exemplary embodiment accommodates all the compensation motions in the axial and radial direction. It should be noted that instead of the shaft shoulder 2a, some other separate component which is secured to the rotor shaft 2 may also be used. Otherwise, the fourth exemplary embodiment corresponds in particular to the first exemplary embodiment, so that the description of the first exemplary embodiment may be referred to.

The foregoing relates to a preferred exemplary embodiment of the invention, it being understood that other variants and embodiments thereof are possible within the spirit and scope of the invention, the latter being defined by the appended claims.

The invention claimed is:

1. In a rotor for an electrical machine, including a rotor shaft, a hollow-cylindrical magnet element, and at least one covering disk, the improvement wherein the at least one covering disk is secured to the rotor shaft via a first connection, and wherein the magnet element has a first axial end secured to the at least one covering disk via a second connection, wherein each said at least one covering disk comprises a yielding region, wherein the yielding region comprises a region that is substantially U-shaped in section and is positioned between the first connection and the second connection, so that the U-shaped yielding region absorbs any difference in expansion between the rotor shaft and the ring magnet, and so that the yielding region provides for a spring travel in both the axial and the radial directions.

2. The rotor for an electrical machine as recited in claim 1, wherein a second axial end of the magnet element rests on a shaft shoulder of the rotor shaft.

3. The rotor for an electrical machine as recited in claim 2, wherein the magnet element is secured to said at least one covering disk by means of an adhesive.

4. The rotor for an electrical machine as recited in claim 2, wherein the yielding region comprises a bead extending in the circumferential direction.

5. The rotor for an electrical machine as recited in claim 1, comprising a first covering disk and a second covering disk, the first and second covering disks being secured to the rotor shaft, and the magnet element being secured on its first axial end to the first covering disk and on its second axial end to the second covering disk.

6. The rotor for an electrical machine as recited in claim 5, wherein the magnet element is secured to said at least one covering disk by means of an adhesive.

7. The rotor for an electrical machine as recited in claim 1, wherein the magnet element is secured to said at least one covering disk by means of an adhesive.

8. The rotor for an electrical machine as recited in claim 1, wherein each said at least one covering disk comprises at least one radially extending slit.

9. The rotor for an electrical machine as recited in claim 1, wherein each said at least one covering disks comprises a plurality of radially extending slits of different lengths.

10. The rotor for an electrical machine as recited in claim 9, wherein each said at least one covering disk comprises radial slits with a first length and radial slits with a second length, the first length being greater than the second length.

11. The rotor for an electrical machine as recited in claim 1, wherein the yielding region comprises a bead extending in the circumferential direction.

12. The rotor for an electrical machine as recited in claim 11, wherein the yielding region is embodied as a connecting region, disposed between a securing region and a retention region for the magnet element, and wherein the connecting region is inclined to the securing region.

13. The rotor for an electrical machine as recited in claim 1, wherein the yielding region is embodied as a connecting region, disposed between a securing region and a retention region for the magnet element, and wherein the connecting region is inclined to the securing region.

14. The rotor for an electrical machine as recited in claim 1, wherein the covering disks comprise at least one slit with a length that extends from the outer circumference of the covering disk to the yielding region.

15. The rotor for an electrical machine as recited in claim 1, wherein the magnet element is a rare earth hollow-cylindrical magnet element, and further comprising a carrier body disposed inside the magnet element which carrier body is spaced apart from the magnet element by a very small gap in the radial direction and wherein the carrier body is spaced apart from the covering disks in the axial direction by another very small gap, and wherein there is no material in the gaps so that the gaps can be made very small, wherein the cover disks are made from a nonmagnetic special steel, and the covering disk is secured axially to the ring magnet by means of adhesive.

16. The rotor for an electrical machine as recited in claim 1, comprising by a cylindrical guard tube surrounding the magnet element.

17. An electrical machine, including a rotor as recited in claim 1.

18. In a rotor for an electrical machine, including a rotor shaft, a hollow-cylindrical magnet element, and at least one covering disk, the improvement wherein the at least one covering disk is secured to the rotor shaft at a first connection, and wherein the magnet element has a first axial end secured to the at least one covering disk at a second connection, wherein each said at least one covering disk comprises a yielding region, each of said at least one covering disk comprises at least one slit with a length that extends from the outer circumference of the covering disk to the yielding region, and wherein the yielding region is embodied as a connecting region, disposed between a securing region and a retention region for the magnet element, and wherein the connecting region is inclined to the securing region and provides both axial and radial yielding, and wherein the yielding region comprises a region that is substantially U-shaped in section and is positioned between the first connection and the second connection, so that the U-shaped yielding region absorbs any difference in expansion between the rotor shaft and the ring magnet, and so that the yielding region provides for a spring travel in both the axial and the radial directions.

* * * * *